(12) United States Patent
Liang et al.

(10) Patent No.: US 12,175,057 B2
(45) Date of Patent: Dec. 24, 2024

(54) SWITCHING MULTIMEDIA CONTENT BASED ON A RESPECTIVE ACT

(71) Applicant: BEIJING ZITIAO NETWORK TECHNOLOGY CO., LTD., Beijing (CN)

(72) Inventors: Chenqi Liang, Beijing (CN); Xiaoshuang Bai, Beijing (CN); Hui Sun, Beijing (CN); Zi Wang, Beijing (CN); Yiying Wu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/087,572

(22) Filed: Dec. 22, 2022

(65) Prior Publication Data

US 2023/0130438 A1 Apr. 27, 2023

Related U.S. Application Data

(63) Continuation of application No. PCT/CN2021/119433, filed on Sep. 18, 2021.

(30) Foreign Application Priority Data

Sep. 25, 2020 (CN) .......................... 202011027625.9

(51) Int. Cl.
*G06F 3/0483* (2013.01)
*G06F 3/0484* (2022.01)
*G06F 3/0488* (2022.01)

(52) U.S. Cl.
CPC .......... *G06F 3/0483* (2013.01); *G06F 3/0484* (2013.01); *G06F 3/0488* (2013.01)

(58) Field of Classification Search
CPC .... G06F 3/0483; G06F 3/0484; G06F 3/0488; H04N 21/4312; H04N 21/47217
See application file for complete search history.

(56) References Cited

U.S. PATENT DOCUMENTS

| 9,762,971 B1 * | 9/2017 | Dodge | ............... H04N 21/4532 |
| 10,303,326 B2 * | 5/2019 | Everette | ............... G06F 3/0482 |

(Continued)

FOREIGN PATENT DOCUMENTS

| CN | 105357562 A | 2/2016 |
| CN | 110110101 A | 8/2019 |

(Continued)

OTHER PUBLICATIONS

Baidu Experience How to Set Up Scroll Left to Check the Author's Other Videos on Kuaishou, https://jingyan.baidu.com/article/fea4511ac345a9f7bb9125ce.html, Apr. 25, 2019, pp. 1-5 with English Translation (5 pages).

(Continued)

*Primary Examiner* — Nicholas Klicos

(57) ABSTRACT

Provided herein are a method and apparatus for providing multimedia content, and device and storage medium. The method described herein includes: playing, within a first page, a first multimedia content of a first group of multimedia content, the first group of multimedia content including a plurality of multimedia content having at least the same multimedia property; receiving a first indication related to a first act; switching, within the first page, to play a second multimedia content adjacent to the first multimedia content in the first group of multimedia content, based on a first direction indicated by the first act; and if receiving a second indication related to a second act, switching, within the first page, to play a third multimedia content in a second group of multimedia content, wherein the second group of multimedia content is different from the first group of multimedia (Continued)

content and includes at least one multimedia content. According to the embodiments of the present disclosure, an aggregated play of the plurality of multimedia can be provided, improving the efficiency of pushing the multimedia content.

22 Claims, 11 Drawing Sheets

(56) References Cited

U.S. PATENT DOCUMENTS

| | | | |
|---|---|---|---|
| 2010/0174993 A1* | 7/2010 | Pennington | G06F 16/44 715/810 |
| 2013/0016129 A1* | 1/2013 | Gossweiler, III | G06F 1/1694 345/173 |
| 2013/0125056 A1* | 5/2013 | Suda | G06F 3/0488 715/846 |
| 2013/0309986 A1* | 11/2013 | Cox | H04N 21/4383 455/179.1 |
| 2014/0351751 A1 | 11/2014 | Wu et al. | |
| 2015/0113407 A1* | 4/2015 | Hoffert | H04N 21/482 715/720 |
| 2016/0370982 A1* | 12/2016 | Penha | H04N 21/47211 |
| 2017/0109008 A1 | 4/2017 | Darby et al. | |
| 2017/0357421 A1* | 12/2017 | Dye | H04N 21/8113 |
| 2018/0101238 A1* | 4/2018 | Thomas-Brigden | G06F 3/017 |
| 2019/0164197 A1* | 5/2019 | Boyd | G06Q 50/01 |

FOREIGN PATENT DOCUMENTS

| | | |
|---|---|---|
| CN | 110636355 A | 12/2019 |
| CN | 110688571 A | 1/2020 |
| CN | 111432288 A | 7/2020 |
| CN | 112153454 A | 12/2020 |
| JP | 2003-333575 A | 11/2003 |
| JP | 2016-200876 A | 12/2016 |
| JP | 2016-540286 A | 12/2016 |
| WO | WO2020188218 A1 | 9/2020 |

OTHER PUBLICATIONS

First Office Action issued Jan. 26, 2022 in Chinese Application No. 202011027625.9, with English translation (20 pages).
Second Office Action issued Jun. 2, 2022 in Chinese Application No. 202011027625.9, with English translation (22 pages).
Third Office Action issued Sep. 5, 2022 in Chinese Application No. 202011027625.9, with English translation (13 pages).
International Search Report issued Oct. 28, 2021 in International Application No. PCT/CN2021/119433, with English translation (6 pages).
Baidu Experience How to Set Up Scroll Left to Check the Author's Other Videos on Kuaishou, https://jingyan.baidu.com/article/fea4511ac345a9f7bb9125ce.html, Apr. 25, 2019, pp. 1-5 (5 pages).
Extended European Search Report issued Sep. 18, 2023 in European Application No. 21871462.4.
Bobic et al., "Stage UI: Live TV Application Tailored for Mobile Devices", IEEE, Sep. 11, 2019, pp. 1-4.
Office action received from Japanese patent application No. 2023508517 mailed on Feb. 27, 2024, 12 pages (6 pages English Translation and 6 pages Original Copy).

* cited by examiner

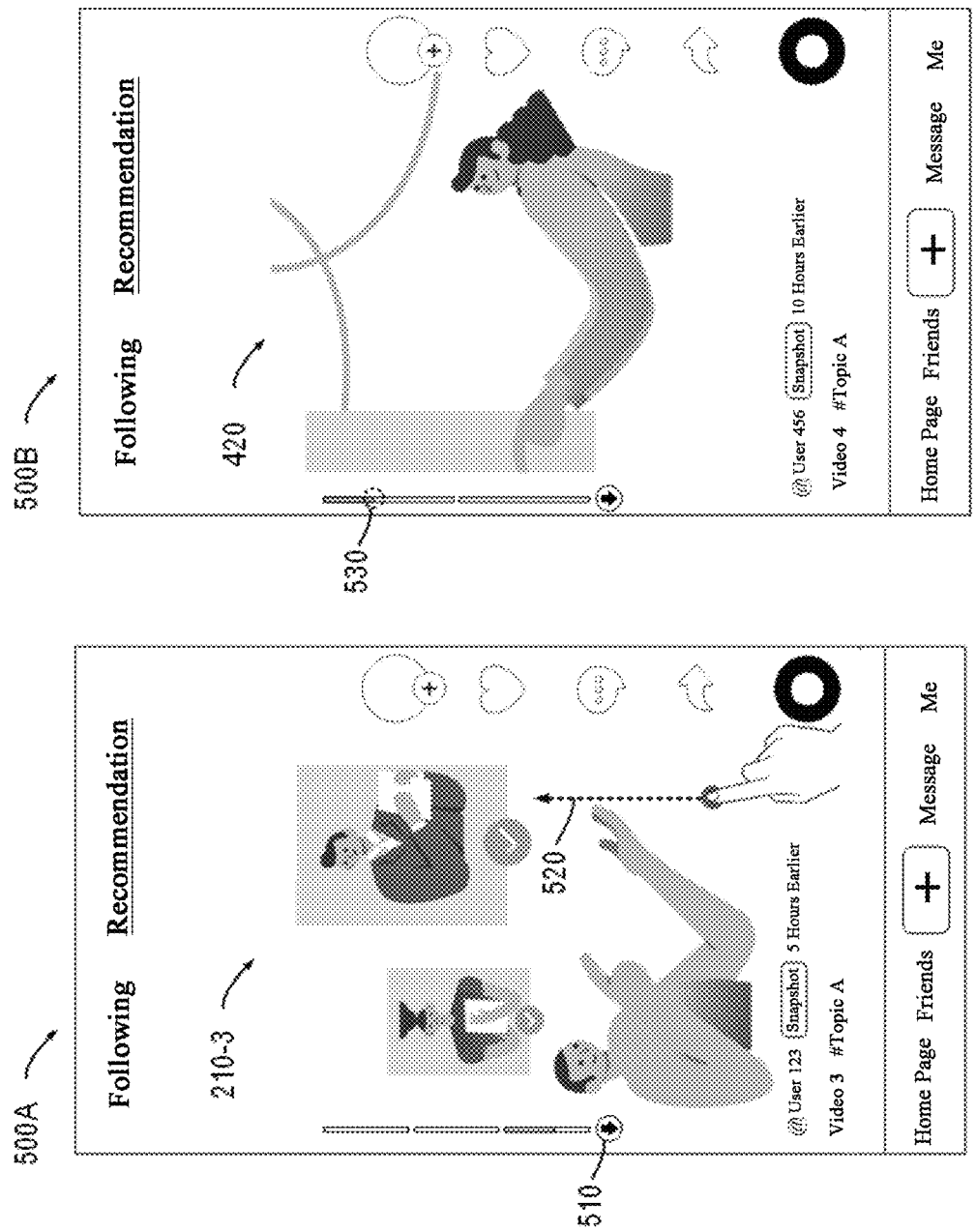

SWITCHING MULTIMEDIA CONTENT BASED ON A RESPECTIVE ACT

FIELD

Various implementations of the present disclosure relate to the field of computers, and more specifically, to method, apparatus, device and computer storage medium for providing multimedia content.

BACKGROUND

With the development of information technology, Internet has become a primary access for people to obtain information. A variety of applications can provide different types of content to people, such as news, music, pictures or videos etc. Some applications also can provide approaches for users to create content. For example, some applications can publish the photos or videos taken by the users into the applications.

There are extremely large amounts of user-generated content (UGC). When receiving pushed content from the applications, the users usually expect to obtain the content of interest more efficiently. In specific, the multimedia content, when being pushed, often occupy a relative large space in the graphic interface of the application. In such case, the users have to go through a complicated procedure to switch between different multimedia content. Therefore, the problem about how to improve the efficiency of pushing the multimedia content has become the focus of attention.

SUMMARY

According to a first aspect of the present disclosure, there is provided a method for providing multimedia content. The method includes: playing, within a first page, a first multimedia content of a first group of multimedia content, the first group of multimedia content including a plurality of multimedia content having at least the same multimedia property; receiving a first indication related to a first act; switching, within the first page, to play a second multimedia content adjacent to the first multimedia content in the first group of multimedia content, based on a first direction indicated by the first act; and if receiving a second indication related to a second act, switching, within the first page, to play a third multimedia content in a second group of multimedia content, wherein the second group of multimedia content is different from the first group of multimedia content and includes at least one multimedia content.

According to a second aspect of the present disclosure, there is provided an apparatus for providing multimedia content. The apparatus includes: a first play module configured to play, within a first page, a first multimedia content of a first group of multimedia content, the first group of multimedia content including a plurality of multimedia content having at least the same multimedia property; a first receiving module configured to receive a first indication related to a first act; a first switching module configured to switch, within the first page, to play a second multimedia content adjacent to the first multimedia content in the first group of multimedia content, based on a first direction indicated by the first act; and a second switching module configured to, if receiving a second indication related to a second act, switch, within the first page, to play a third multimedia content in a second group of multimedia content, wherein the second group of multimedia content is different from the first group of multimedia content and includes at least one multimedia content.

According to a third aspect of the present disclosure, there is provided an electronic device, including: a memory and a processor; wherein the memory stores one or more computer instructions, wherein the one or more computer instructions are executed by the processor to implement the method according to the first aspect of the present disclosure.

According to a fourth aspect of the present disclosure, there is provided a computer-readable storage medium having stored thereon one or more computer instructions, wherein the one or more computer instructions are executed by a processor to implement the method according to the first aspect of the present disclosure.

Various embodiments of the present disclosure, on one hand, the efficiency of pushing the multimedia content is improved by the aggregated playing of a plurality of multimedia content having common multimedia property. On the other hand, the rapid switching between different groups of multimedia content is also achieved, which improves the friendliness of the user interaction and further helps the users more conveniently obtain the multimedia content of interest.

BRIEF DESCRIPTION OF THE DRAWINGS

Through the following detailed description with reference to the accompanying drawings, the above and other features, advantages and aspects of various implementations of the present disclosure will become more apparent. In the drawings, the same or similar reference signs indicate same or similar elements, wherein:

FIGS. 5A-5B illustrate an example interface for inter-group switching of multimedia content in accordance with further embodiments of the present disclosure;

DETAILED DESCRIPTION OF EMBODIMENTS

Figure 1:
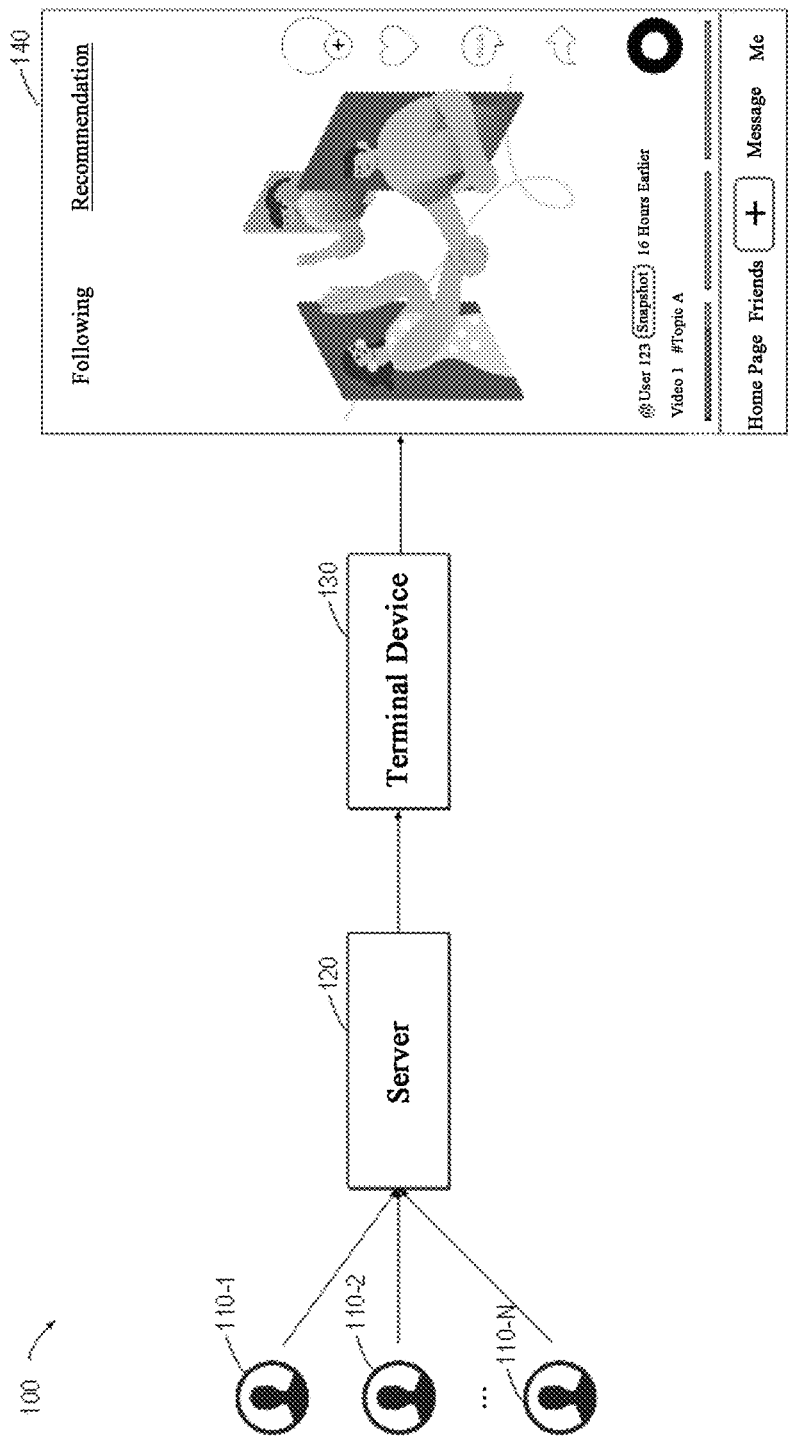
FIG. 1 illustrates a schematic diagram of an example environment in which a plurality of embodiments of the present disclosure are implemented.

Embodiments of the present disclosure will be described below in more details with reference to the drawings. Although the drawings illustrate some embodiments of the present disclosure, it should be appreciated that the present disclosure can be implemented in various manners and should not be interpreted as being limited to the embodiments explained herein. On the contrary, the embodiments are provided to enable those skilled in the art to understand the present disclosure more thoroughly and completely. It should be appreciated that the drawings and embodiments of the present disclosure are exemplary only and are not intended for restricting the protection scope of the present disclosure.

In the description of embodiments disclosed herein, the term "include" and its similar expressions are to be read as open-ended terms that mean "include, but not limited to." The term "based on" is to be read as "based at least in part on." The term "an example embodiment" or "this embodiment" is to be read as "at least one embodiment." The terms "first", "second" and so on can refer to same or different objects. The following text also can include other explicit and implicit definitions.

In recent years, people are getting more enthusiastic about sharing and obtaining information through the Internet. In specific, some applications can provide a platform for users to create and share multimedia content and obtain the multimedia content of interest. For example, the users may upload, via the applications, a clip of created video, captured photos or sung songs etc.

When pushing such multimedia content to the users, the applications usually arrange a relatively large display space in the interface to show the multimedia content, such that the users may have a more satisfactory browsing experience. For example, when pushing video content, some video sharing applications may display such video content in an almost full screen manner. In such scenario, the users, for example, may swipe up and down on the screen to switch the multimedia content, such as videos, images or audios etc.

However, the above browsing method is low efficient for the users. On one hand, the multimedia content may be switched randomly by swiping up and down, and it is difficult for the users to perform the intended operation explicitly. For example, when the users are interested in the multimedia content published (posted) by a given creator and intended to further browse their other works, they might need to enter the homepage of the creator and open his profile. The costs for the above interaction process are great for users.

On another hand, if the creator followed by the users published a lot of multimedia content within a short period of time, the applications may still push this batch of multimedia content to the users within a short period of time, despite the users show less interest in such multimedia content. Accordingly, while the users are swiping up and down to switch the multimedia content, this batch of multimedia content may flood the screen for the users, resulting in the user experience is heavily degraded.

To at least partly solve one or more of the above and other potential problems, example embodiments of the present disclosure provide a solution for providing the multimedia content. In general, according to the embodiments described herein, a first multimedia content in a first group of aggregated multimedia content may be played within a first page, wherein a plurality of multimedia content included in the first group of multimedia content is aggregated at least based on the same multimedia property. A first indication related to a first act is received subsequently, and it is to be switched, within the first page, to play a second multimedia content adjacent to the first multimedia content in the first group of multimedia content, based on a first direction indicated by the first act. In addition, if a second indication related to a second act is received, it is to be switched, within the first page, to play a third multimedia content in a second group of multimedia content, wherein the second group of multimedia content is different from the first group of multimedia content and the second group of multimedia content includes at least one multimedia content.

In this way, by aggregated playing of a plurality of multimedia content having common multimedia property, the solution of the present disclosure can help the users more conveniently obtain the multimedia content of interest or filter out the multimedia content in which the users show no interests, improving the efficiency of pushing the multimedia content. In addition, the solution of the present disclosure can also achieve rapid switching of different groups of multimedia content, improving the friendliness of user interaction, and further improving the user experience of obtaining multimedia content.

Specific embodiments of the present disclosure are to be described below with reference to the drawings.

Example Environment

FIG. 1 illustrates a schematic diagram of an example environment 100 in which a plurality of embodiments of the present disclosure are implemented. In the example environment 100, one or more creators 110-1, 110-2 to 110-N (individually or collectively known as creator 110) may upload to a server the multimedia content created by the creator 110 via a creator device. Such multimedia content, for example, may include videos, pictures, audios or combinations thereof. For example, the creator 110 may upload a clip of video or taken photos to the server 120. Alternatively, the creator 110 also may add a specific music to the video or photo and then upload the combined multimedia content to the server 120.

As shown in FIG. 1, the server 120 also may send the multimedia content created by the creator 110 to a terminal device 130. For example, the terminal device 130 may be an electronic device used by users of a multimedia sharing application. Examples of the terminal device include, but not limited to, smartphone, tablet computer, smartwatch, smart glasses, notebook computer, desktop computer and any other suitable terminal devices. The terminal device 130, for example, may provide the multimedia content created by the creator 110 via the installed multimedia sharing application.

It is to be understood that the user of the terminal device 130 also may be the creator 110, who may obtain the multimedia content created by other creators 110 using the multimedia sharing application, and also may upload the multimedia content created by his/her own through the multimedia sharing application.

According to FIG. 1, the terminal device 130, for example, may provide an interface 140 to the user. The interface 140, for example, may be a graphical user interface of the multimedia sharing application installed on the terminal device 130. The interface 140 may present the plurality of content uploaded by the creator 110 as shown in FIG. 1.

A detailed procedure of presenting the multimedia content to the user by the terminal device 130 is described below.

Intra-Group Switching of Multimedia Content

To push the multimedia content in a more efficient way, the terminal device 130 can provide a plurality of multimedia content in an aggregated-playing manner. Example implementations of aggregated playing are to be introduced below with reference to FIGS. 2 to 3.

Figure 2B:
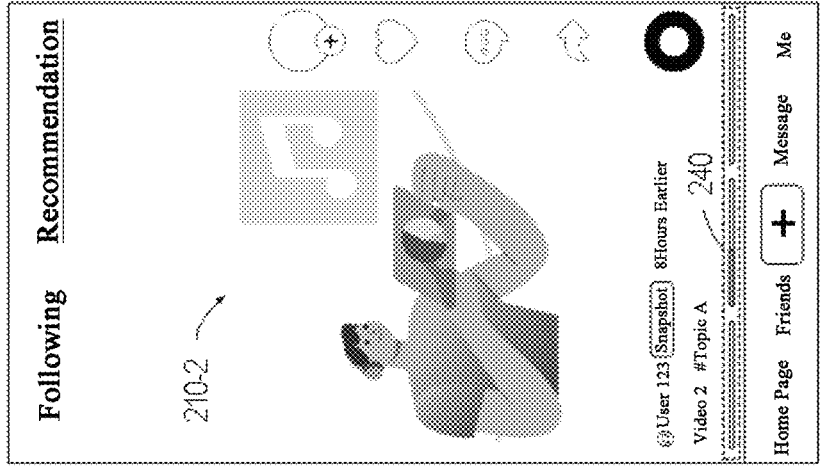
FIGS. 2A-2B illustrate an example interface for intra-group switching of multimedia content in accordance with some embodiments of the present disclosure.
Figure 2A:
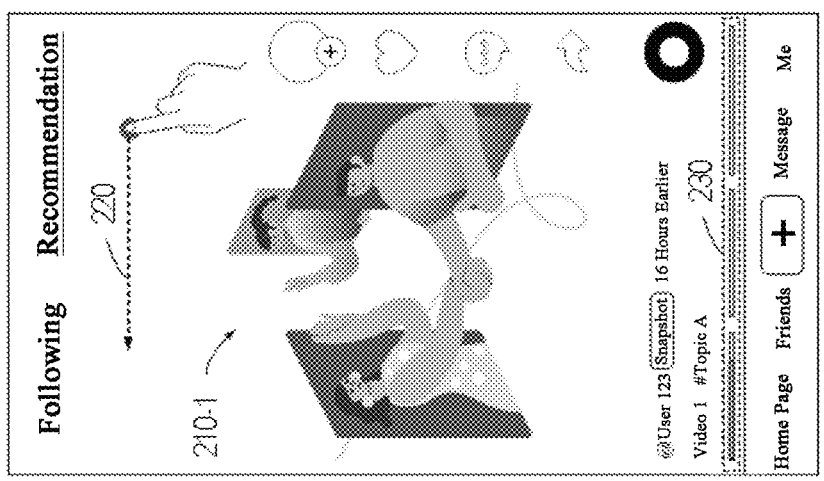

FIG. 2A illustrates an example interface 200A for intra-group switching of multimedia content in accordance with some embodiments of the present disclosure. As shown in FIG. 2A, after the user opens the multimedia sharing application installed on the terminal device 130, the terminal device 130, for example, may display the interface 200A to the user. For example, the interface 200A may be a "Recommendation Page" in the multimedia sharing application.

According to FIG. 2A, the terminal device 130 may play the multimedia content 210-1 (referred to as "first multimedia content" for the sake of description) in the interface 200A. In some implementations, the first multimedia content 210-1 may include videos, audios or pictures etc. for example, the first multimedia content 210-1 may be a segment of video content. During the play of the first multimedia content 210-1, the terminal device 130, for example, may play the video via a display device and play the corresponding sound through a loudspeaker.

Alternatively, the first multimedia content 210-1 also may include a combination of picture and music. During the play of the first multimedia content 210-1, the terminal device 130, for example, may present the picture via a display device and play the music through a loudspeaker. Or the first multimedia content 210-1 also may include static or dynamic pictures (e.g., GIF picture).

Unlike the conventional solutions for providing the multimedia content, the multimedia content 210-1 provided by the terminal device 130 is included in a group of multimedia content (referred to as "first group of multimedia content" for the sake of description), wherein the first group of multimedia content includes a plurality of aggregated multimedia content.

In some implementations, the first group of multimedia content may be aggregated by the server 120. For example, the server 120 may aggregate the plurality of multimedia content into the first group of multimedia content based on the plurality of multimedia content having one or more same multimedia properties.

In some implementations, the multimedia property for aggregation may include publisher. For example, the server 120 may automatically aggregate the multimedia content published by the same creator 110 into a group of multimedia content, such that the terminal device 130 can play this group of multimedia content in an aggregated manner. Or, the server 120 may automatically aggregate the multimedia content published by the creators 110 belonging to the same group into a group of multimedia content.

In another implementation, the multimedia property for aggregation may include publishing time period. For example, the server 120 may aggregate a plurality of multimedia content published on the same day into a group of multimedia content. Or the server 120 also may aggregate a plurality of multimedia content published within the last 24 hours.

In some further implementations, the multimedia property for aggregation may include multimedia type. For example, the server 120 may aggregate videos having the type of "short video" (e.g., having a length shorter than a predetermined length). Or the server 120 may aggregate the multimedia content created via a specific capture entrance (such as videos taken via the functionality, such as Quick Capture, Snapshot, etc, in the video sharing application).

In some other implementations, the multimedia property for aggregation also may include subject of content. For example, the server 120 may aggregate a plurality of multimedia content having the same tag based on the content tags attached to the multimedia content by the creator 110 when being published. Or, the server 120 also may automatically analyze the subject of the multimedia content and aggregate the multimedia content based on the analyzed subject.

In some implementations, the server 120 also may aggregate the multimedia play content based on a plurality of multimedia properties discussed above. For example, the server 120 may aggregate the video content created by the same user via the approach of Quick Capture during the last 24 hours. Or, the server 120 may aggregate the multimedia content having the same content tag and created by the users within the same group on the same day.

Additionally or alternatively, the server 120, for example, also may configure the upper limit of the number of the multimedia content in the group of the aggregated multimedia content. For example, to make the interface display of the terminal device 130 more user-friendly, the server 120 for example may configure that the group of the aggregated multimedia content includes no more than 10 multimedia content. When the number of multimedia content satisfying the aggregation condition exceeds the upper limit, the server 120 for example may determine a predetermined number of multimedia content based on the predetermined condition. For example, when the number of Quick Capture works (videos created via the approach of Quick Capture) which has been already published by a user within the last 24 hours is up to 12, the server 120 may aggregate the publishing time latest 10 Quick Capture works into a group of multimedia content.

It is to be appreciated that the specific number configuration mentioned in the above discussion is only exemplary. The multimedia content can be organized more efficiently through the above discussed aggregation manners of the multimedia content. As a result, the users can more conveniently select the multimedia content of interest or filter out the multimedia content groups of no interest.

In some implementations, for example, after aggregating the plurality of multimedia content into the first group of multimedia content, the server 120 may also provide information related to the first group of multimedia content when sending the first multimedia content 210-1 to the terminal device 130. As such, the terminal device 130 can provide the first group of multimedia content via the aggregated playing manner.

Referring to FIG. 2A as the example, while playing the first multimedia content 210-1 in the interface 200A, the terminal device 130 also may present a visual indication 230 based on the information related to the first group of multimedia content obtained from the server 120. For example, the terminal device 130 may determine, based on the information obtained from the server 120, that the first group of multimedia content contains three multimedia content and correspondingly indicate to the users via the visual indication 230 that further two multimedia content are aggregated into the group of multimedia content in which the first multimedia content 210-1 is. In FIG. 2A, the terminal device 130 indicates that the first group of multimedia content includes three multimedia content by presenting three separate lines at the bottom of the interface 200A.

In some implementations, the information related to the first group of multimedia content received by the terminal device 130 from the server 120, for example, also may include type and/or length of each multimedia content included in the first group of multimedia content. For example, the terminal device 130 may determine, based on the received information, that the first group of multimedia content includes the following three multimedia content: a clip of video lasting 40 seconds, a picture accompanied with background music for 30 seconds and a 20-second audio. Correspondingly, the visual indication 230 presented by the terminal device 130, for example, also may reflect the length of the respective multimedia content in the first group of multimedia content. By way of example, the terminal device 130 may provide a longer line to reflect that the corresponding multimedia content has a relatively longer play time. In some implementations, the terminal device 130 may correspondingly present a line of a predetermined length for the static multimedia content (e.g., static picture), or the terminal device 130 may present other types of graphics to indicate that it corresponds to a static picture.

In some implementations, the terminal device 130, for example, may indicate which multimedia content of the first group of multimedia content are being browsed by the user by adjusting the display of a corresponding part of the visual indication 230. For example, when the first multimedia content 210-1 is being played, the terminal device 130 may indicate that the user is currently browsing the first multimedia content 210-1 by highlighting the corresponding line part.

Additionally, when the corresponding multimedia content includes videos or audios, the visual indication 230 also can embody the play progress of the corresponding multimedia content. According to FIG. 2A, the terminal device 130 indicates the current play progress of the first multimedia content 210-1 by a color gradually filled in the first segment of line of the visual indication 230. It should be understood that such play progress also can simultaneously remind that the user is currently browsing the first multimedia content 210-1 in the first group of multimedia content.

By the terminal device 130 providing the aggregated playing of the first group of multimedia content, the users also can more conveniently implement switching between different multimedia content in the first group of multimedia content. Specifically, the terminal device 130 receives a first indication related a first act performed by the user and implements content switching in the first group of multimedia content based on a direction indicated by the first act.

As shown in FIG. 2A, the terminal device 130, for example, may receive a swipe-to-left act 220 that occurs from right to left on a touchscreen. The swipe-to-left act 220 indicates the interaction direction is towards left, and the terminal device 130 may accordingly determine a second multimedia content 210-2 corresponding to the left direction and adjacent to the first multimedia content 210-1 in the first group of multimedia content. Correspondingly, the terminal device 130 may switch to an interface 200B to continue to play the second multimedia content 210-2 in the recommendation page.

In some implementations, the terminal device 130 also may receive indications associated with other types of user acts. For example, the terminal device 130 may detect using a sensor that the user is tilting the terminal device 130 towards the right. Correspondingly, the act of tilting the terminal device 130 towards the right also may indicate the interaction direction is towards right. The terminal device 130 may correspondingly switch to present the interface 200B to play the second multimedia content.

Examples of the interaction acts also may include, but not limited to: eye movement of the user, face movement of the user, mid-air gesture of the user or voice command of the user (e.g., "switch to the left"). It should be appreciated that the terminal device 130 may detect the user interaction act via a suitable sensor or interactive recognition techniques, and determine the direction indicated by the interaction acts.

As illustrated in FIG. 2B, after switching to play the second multimedia content 210-2, the terminal device 130 for example update the original visual indication 230 to a new visual indication 240, indicating that the user is currently browsing the second multimedia content. Likewise, when the second multimedia content 210-2 includes videos or audios, the visual indication 240 also may indicate the play progress of the second multimedia content 210-2.

In some implementations, besides implementing the switching between different multimedia content in the first group of multimedia content by performing a specific interaction, the terminal device 130 also may support automatic switching in the first group of multimedia content. As an example, after the play of the first multimedia content 210-1 is over, the terminal device 130 may automatically switch to play the second multimedia content 210-2. Alternatively, the terminal device 130 also may automatically switch to the second multimedia content 210-2 after the first multimedia content 210-1 has been played repeatedly by a predetermined number. It is to be understood that this switching mechanism may be suitable for automatic switching between any two multimedia content in the first group of multimedia content.

In some implementations, if the multimedia content being played currently is already the last multimedia content in the first group of multimedia content, the terminal device 130 may no longer perform the automatic switching of the multimedia content. Alternatively, the terminal device 130 also may switch to the first multimedia content in the first group of multimedia content based on the same mechanism.

Additionally, to prevent the automatic switching mechanism from impacting the user's operations, the terminal device 130 also may not perform the automatic switching of the multimedia content when the user's specific operation is not completed yet. As an example, during the play of the second multimedia content 210-2, the terminal device 130 receives an operation of the user associated with the second multimedia content 210-2. Such operation, for example, may include, but not limited to: the user opens a comment panel and is about to input a comment; the user clicks a forward button to forward the multimedia content; the user gives a thumb-up to the multimedia content; the user views the thumb-up record of the video; and the user views the comment list of the video.

It should be appreciated that such operations is only exemplary. The terminal device 130 also may detect other operations that manifest an interactive intention of the user with regard to the second multimedia content 210-2 being played currently.

When the play of the second multimedia content 210-2 is over, the terminal device 130 may not switch to the next multimedia content automatically if a specific operation of the user is not finished yet. Instead, the terminal device 130 may suspend playing the second multimedia content 210-2 or replay the second multimedia content 210-2. In this way, the user interaction with the multimedia content being played currently is avoided from interference, thereby improving the friendliness of user interaction.

Figures 3A, 3B:
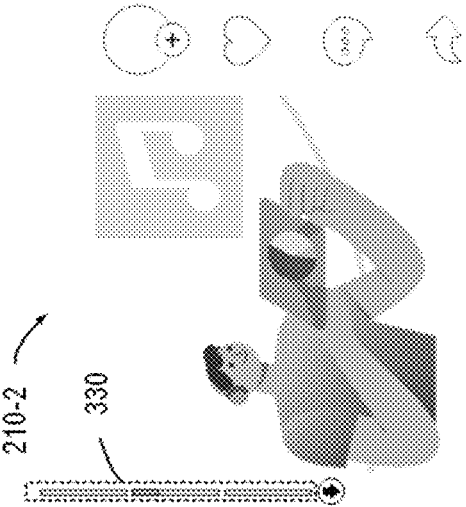
FIGS. 3A-3B illustrate an example interface for intra-group switching of multimedia content in accordance with further embodiments of the present disclosure.

An example of intra-group switching of multimedia content in accordance with embodiments of the present disclosure has been described above with reference to FIGS. 2A-2B. FIGS. 3A-3B illustrate an example of intra-group switching of multimedia content in accordance with another embodiment of the present disclosure.

FIG. 3A illustrates an example interface 300A for playing the first multimedia content in accordance with another embodiment of the present disclosure. As shown, the terminal device 130 may automatically switch to an interface 300B shown in FIG. 3B after receiving an upward swiping act 320 from the user, so as to switch to play the second multimedia content 210-2, which is different from the interface 200A. Correspondingly, the terminal device 130 also may present a visual mark 310 in a vertical direction at the left side of the interface 300A, and present a new visual mark 330 subsequent to switching to the interface 300B.

In some implementations, to facilitate the users to understand and learn such switching mechanism, when the user browses the multimedia content presented in the aggregated manner for the first time, the terminal device 130 also may provide guidance to teach the users how to complete a quick switching of a group of multimedia content. In the example shown by FIG. 3A, the terminal device 130 for example may pop up a text floating window saying "swipe up to view another two snapshot videos of the user !", to help the user more rapidly understand the interaction logic.

According to the above discussed switching methods, the user can more conveniently switch to other multimedia content aggregated into the same group of multimedia content, thereby the user operation being simplified. For example, if the group of aggregated multimedia content is the works of the same subject published by the same person, if the user shows interest to the first work, the user may quickly switch to other works of the same subject published by this person. Therefore, the content that may interest the user can be more efficiently provided.

In some implementations, the terminal device 130 receives the data of the second multimedia content 210-2 upon switching to play the second multimedia content 210-2 from the first multimedia content 210-1. Alternatively, while playing the first multimedia content 210-2, the terminal device 130 also pre-loaded all data of the first group of multimedia content, so as to more rapidly switch to play other multimedia content.

Alternatively or additionally, considering that the first group of multimedia content may contain a large amount of multimedia content, the users may not browse all multimedia content in the first group of multimedia content. The terminal device 130 also may pre-load the number of multimedia content that is less than a predetermined number threshold, to gain a balance between switching speed and traffic economizing.

Inter-Group Switching of Multimedia Content

The terminal device 130 also can implement efficient switching of multimedia content between different groups. Example procedures of multimedia content switching between different groups are to be described below with reference to FIGS. 4A-4B and 5A-5B.

Figure 4A:
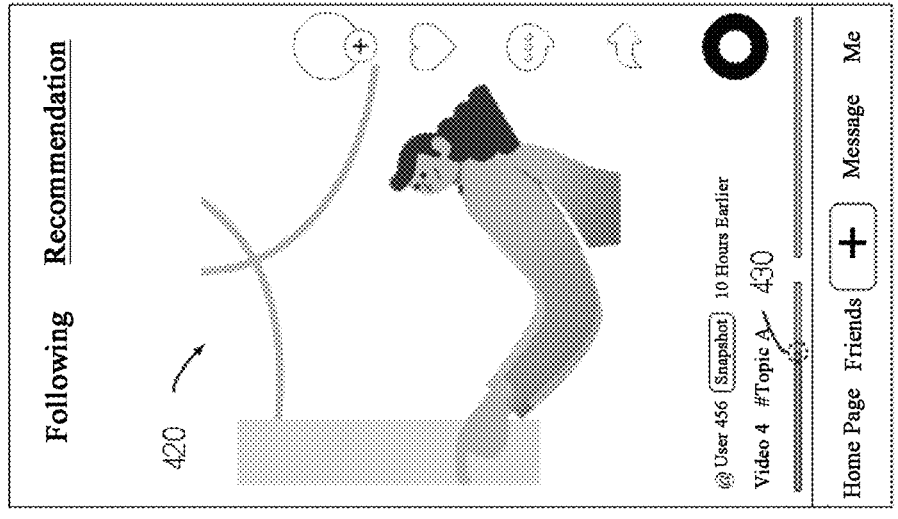
FIGS. 4A-4B illustrate an example interface for inter-group switching of multimedia content in accordance with some embodiments of the present disclosure.

As shown in FIG. 4A, while playing the second multimedia content 210-2 in the interface 400A, the terminal device 130 may receive a second indication related to a second act. For example, the terminal device 130 may receive a swipe-up act 410 on the touchscreen performed by the user.

As an interaction direction (upward) indicated by the above swiping act 410 is vertical to the first direction (leftward), the terminal device 130 may switch to present an interface 400B, so as to switch to play a third multimedia content 420 in a second group of multimedia content in the recommendation page. It is to be understood that the terminal device 130 for example may switch to play another group of multimedia content when the user is performing swipe-down act.

As discussed with reference to the first act, in addition to swiping, examples of the second act also may include, but not limited to: changing a posture of the terminal device 130 by the user, eye movement of the user, face movement of the user, mid-air gesture of the user or voice command of the user (e.g., "switch to the left").

Figure 4B:
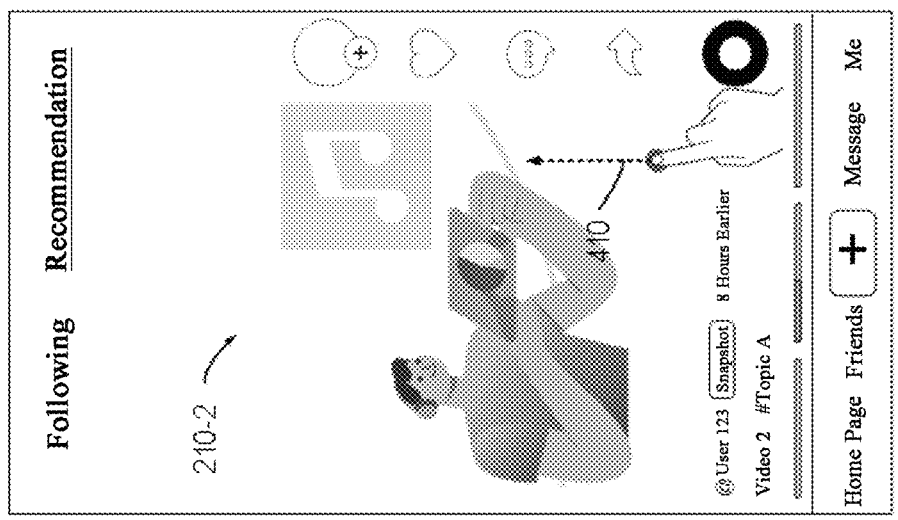

Besides, it will be appreciated that although the second group of multimedia content includes two multimedia content according to FIG. 4B, it is only exemplary and the second group of multimedia content may include the third multimedia content 420 alone or more multimedia content.

FIGS. 5A-5B illustrate an example of the inter-group switching of multimedia content in accordance with a further embodiment of the present disclosure. As shown in FIG. 5A, the terminal device 130 plays the last multimedia content 210-3 of the first group of multimedia content in an interface 500A. At this moment, if the terminal device 130 receives the second indication related to the second act and determines that the direction indicated by the second act is the same as the first direction, the terminal device 130 also may determine whether the first group of multimedia content includes a multimedia content that is adjacent to this multimedia content and associated with the second direction.

For example, in the example of FIG. 5A, upon receiving a swipe-up act 520, the terminal device 130 may determine that the first group of multimedia content does not include the multimedia content associated with the second direction since the multimedia content 210-3 has already been the last multimedia content in the first group of multimedia content. Correspondingly, if a determination is made that the first group of multimedia content does not include a multimedia content adjacent to this multimedia content and associated with the second direction, the terminal device 130 may switch to an interface 500B, to switch, in the recommendation page, to play the third multimedia content 420 in the second group of multimedia content.

In some implementations, as to the example of FIG. 5A, the terminal device 130 for example also may present a switching button 510 in the interface 500A. When the user clicks the button 510, the terminal device 130 may quickly switch to a next group of multimedia content despite whether the multimedia content being played currently is the last multimedia content in this group of multimedia content.

Although the terminal device 130 has been switched to the first multimedia content in the second group of multimedia content in the examples of FIGS. 4B and 5B, it should be understood that this is only exemplary and the terminal device 130 also may adopt different switching strategies.

In some implementations, if the switched second group of multimedia content includes a plurality of multimedia content, the terminal device 130 may switch to multimedia content unread by an object account associated with the terminal device 130. The object account for example may be an account logged onto an application for providing the interface 400B or the interface 500B. For example, in the examples of FIGS. 4B and 5B, if the terminal device 130 determines that the object account has once browsed the first multimedia content in the second group of multimedia content, the terminal device 130 may directly switch to play the unread multimedia content in the second group of multimedia content.

Alternatively, the terminal device 130 may switch to multimedia content associated with preferences of the object account. For example, if the subject of the first multimedia content in the second group of multimedia content is "sports" and the subject of the second multimedia content in the second group of multimedia content is "tourism", the terminal device 130 may directly switch to play the second multimedia content of which the subject is "tourism", based on the preferences of the object account also including "tourism".

Alternatively, the terminal device 130 also may switch based on a browsing history of the object account. In some implementations, the terminal device 130 may switch to play the multimedia content that is last browsed by the object account of the second group of multimedia content last time. For example, if the object account is browsing the second multimedia content when exiting the second group of multimedia content, the terminal device 130 may switch to play the multimedia content that is last browsed by the object account.

Additionally, the terminal device 130 also may determine a play time of the multimedia content being played upon the exit of the user from the second group of multimedia content last time, and play the multimedia content that is last browsed by the object account in the second group of multimedia content from this play time as the object starting point.

For example, in the example of FIG. 4B, if a third multimedia content was being played to a time 430 when the user exited the second group of multimedia content last time, the terminal device 130 may switch to play the third multimedia content 420 starting from the time 430. Likewise, for the example of FIG. 5B, the terminal device 130 for example also may play the third multimedia content from a time 530.

Examples of switching between different groups of multimedia content have been discussed above. With the inter-group switching method described in the present disclosure, embodiments according to the present disclosure can improve friendliness of the user interactions and further help the users to more conveniently obtain the multimedia content of interest.

Switching Between Different Pages

Embodiments of the present disclosure also provide efficient page switching besides the above discussed inter-group and intra-group multimedia content switching. An example procedure of page switching in accordance with embodiments of the present disclosure is to be depicted below with reference to FIGS. 6A-6C.

Figure 6C:
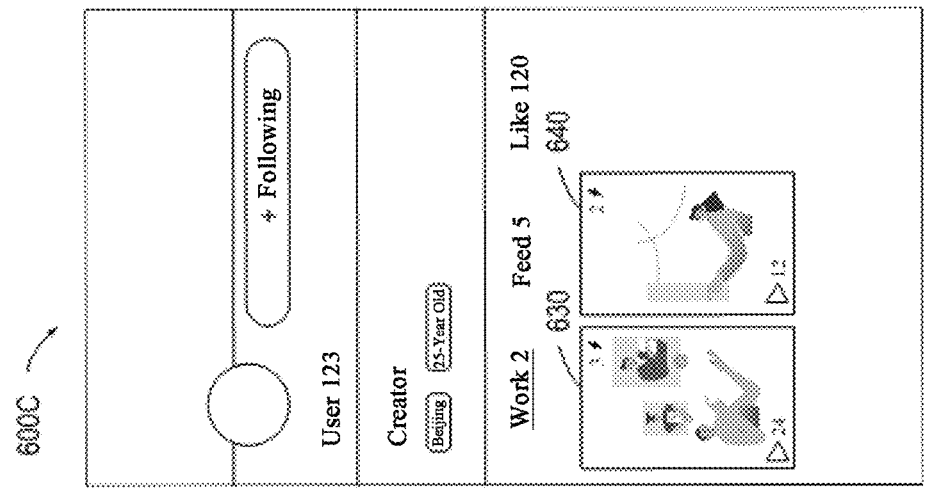
FIGS. 6A-6C illustrate an example interface for switching between different pages in accordance with some embodiments of the present disclosure.
Figure 6B:
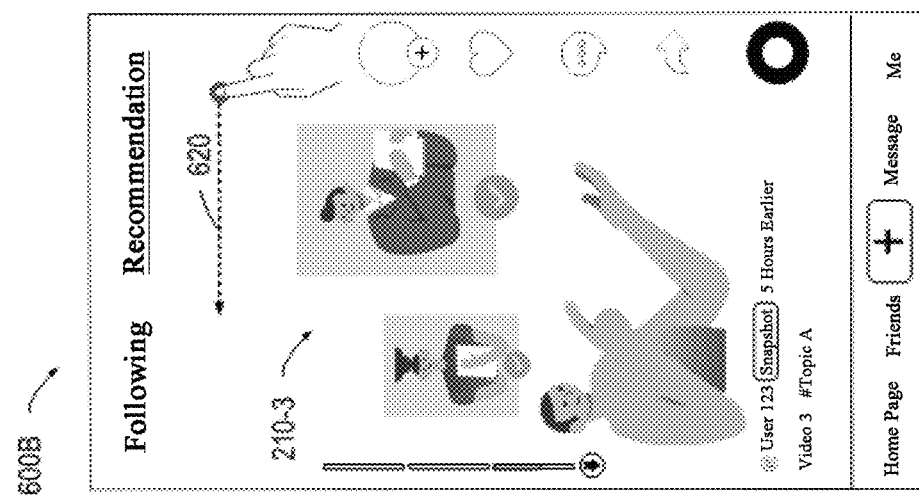
Figure 6A:
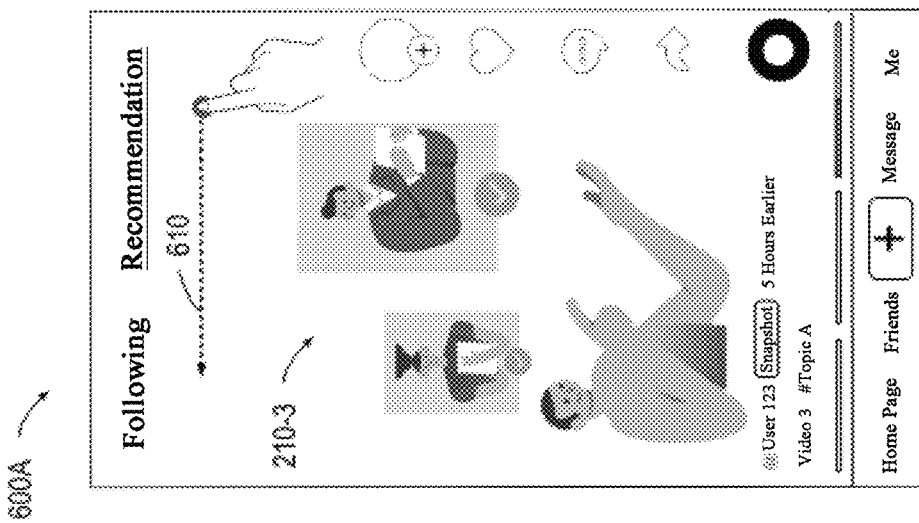

For the example shown in FIG. 6A, when the terminal device 130 plays, in an interface 600A, the last multimedia content 210-3 of the first group of multimedia content, the terminal device 130 may receive a third indication related to a third act. For example, the terminal device 130 may receive a swipe-to-left act 610 on the touchscreen by the user.

At this moment, the terminal device 130 may determine that the third direction indicated by the swipe-to-left act 610 is the same as the first direction discussed with reference to FIG. 2A, and the first group of multimedia content does not include the second multimedia content that is adjacent to the multimedia content 210-3 and associated with the third direction. Correspondingly, the terminal device 130 for example may switch to a further page different from the recommendation page. For example, the further page may be a personal homepage 600C of the user associated with the multimedia content 210-3 as shown in FIG. 6C.

It is to be understood that, for the example of FIG. 6A, when the first multimedia content 210-1 of the first group of multimedia content is being played, the terminal device 130 also may similarly switch to a page of interest if the user performs a swipe-to-right act.

For the example shown in FIG. 6B, when the terminal device 130 plays, in an interface 600B, the multimedia content 210-3 of the first group of multimedia content, the terminal device 130 may receive a fourth indication related to a fourth act. For example, the terminal device 130 may receive a swipe-to-left act 620 on the touchscreen by the user.

At this moment, the terminal device 130 may determine that the fourth direction (leftward) indicated by the swipe-to-left act 620 is vertical to the first direction (upward) discussed with reference to FIG. 3A. Correspondingly, the terminal device 130 for example may switch to a further page different from the recommendation page. For example, the further page may be a personal homepage 600C of the user associated with the multimedia content 210-3 as shown in FIG. 6C.

It is to be understood that, for the example of FIG. 6B, the terminal device 130 may execute the page switching regardless of which of the multimedia content of the first group of multimedia content is being played while the user performs the swipe-to-left act. Likewise, the terminal device 130 may switch to the page of interest while the user performs the swipe-to-right act.

According to the above discussion, FIG. 6C illustrates an example personal homepage 600C in accordance with embodiments of the present disclosure. As shown in FIG. 6C, the personal homepage 600C may include a first cover 630 and a second cover 640 of a work published by the user.

By way of example, a top right corner of the first page 630 and the second page 640 may include type and number of a group of multimedia content corresponding to the first cover. For example, the top right corner of the first cover 630 consists of a number "3" and a flash icon, to indicate that a group of multimedia content corresponding to the first cover 630 includes three snapshot works. In addition, a bottom left corner of the first page 630 and the second page 640, for example, also may include play details of a corresponding group of multimedia content.

In some implementations, the first cover 630 for example may be extracted from the latest multimedia content (e.g., multimedia content 210-3) of the corresponding group of multimedia content (such as first group of multimedia content). Alternatively, the first cover 630 for example also may embody the entire multimedia content in the corresponding group of multimedia content at the same time. For example, the first cover 630 may be obtained by processing three pictures of three snapshot videos included in this group of multimedia content.

In some implementations, the user may browse corresponding multimedia content by clicking the first cover 630 or the second cover. For example, the first cover 630 may correspond to the first group of multimedia content and the second cover 640 may correspond to the second group of multimedia content. The user may play the first group of multimedia content by selecting the first cover 630. For example, the terminal device 130 may present an interface similar to the interface 200A or 300A, wherein the terminal device 130 may not display a top tag bar or a bottom menu according to the requirements of the page display. Correspondingly, the terminal device 130 for example may switch to the second group of multimedia content corresponding to the second cover 640 in response to a swiping operation by the user.

It should be appreciated that the above discussed inter-group and intra-group multimedia content switching also may apply to switching between different groups of multimedia content within a specific user homepage. This will not be elaborated here.

Provision of Browsing History

Figures 7A, 7B:
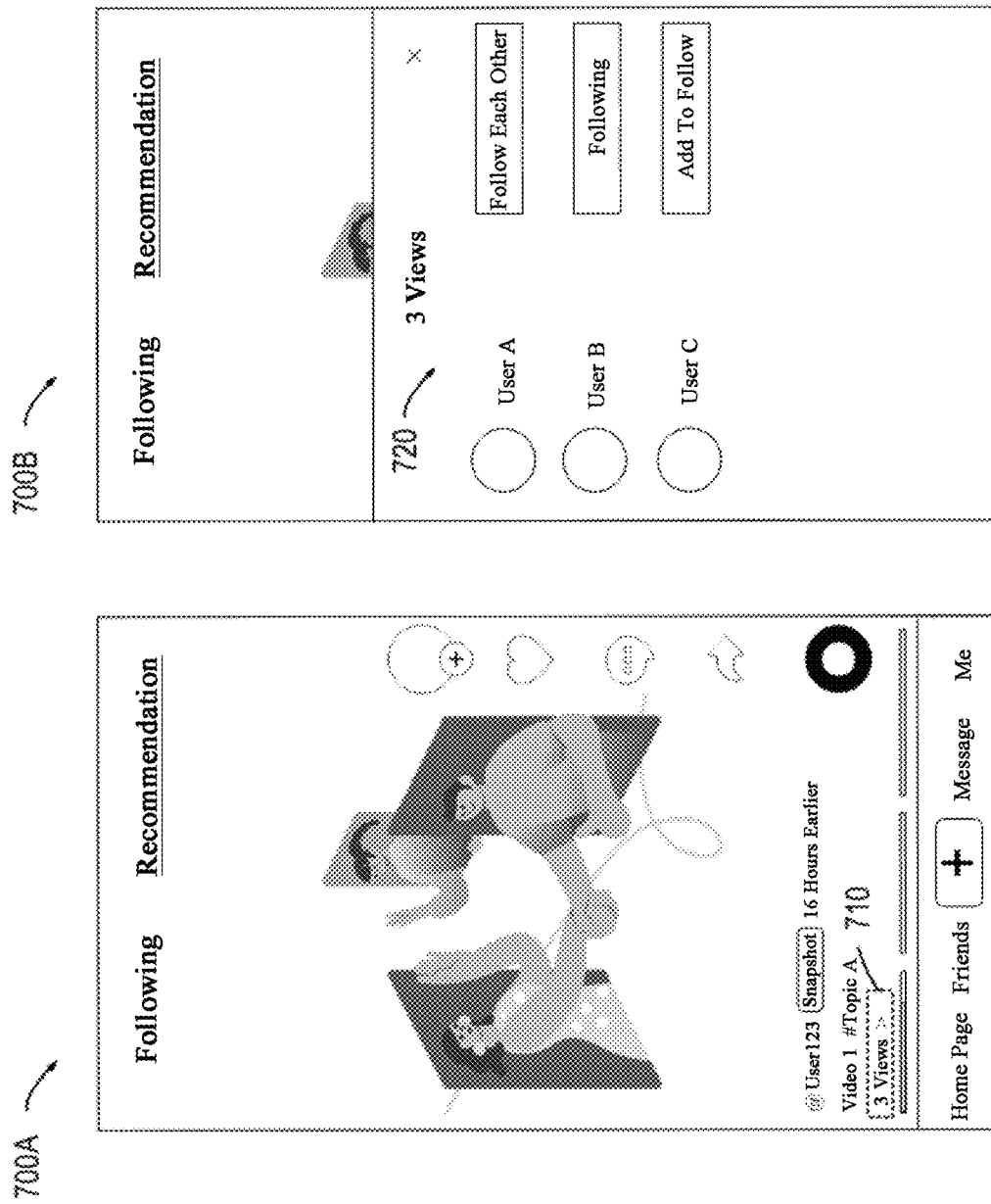
FIGS. 7A-7B illustrate an example interface for viewing a browsing history in accordance with some embodiments of the present disclosure.

In some implementations, to facilitate the creator to view the browsing history of the video, embodiments of the present disclosure also may support the user to view the browsing details of the multimedia content. FIGS. 7A-7B illustrate an example interface for viewing the browsing history. As shown in FIG. 7A, while playing, in the interface 700A, a group of multimedia content in an aggregated manner, the terminal device 130 also may present an indication 710 regarding the browsing details of the played multimedia content. For example, when the user clicks this indication, the terminal device 130 may present an interface 700B and display a pop-up window 720 to provide a history of browsing the multimedia content.

In some implementations, the history of browsing the multimedia content, for example, may be collected by the server 120. Alternatively, the user also may configure whether a history of accessing a specific type of multimedia content by him/her is to be collected by the server 120. For example, the user may disable the server 120 from collecting a history of accessing the multimedia content of other creators by him/her.

As shown in FIG. 7B, the terminal device 130, for example, also may provide in the pop-up window 720 an entrance for a fast interaction with the specific user that browsed this multimedia content. For example, the terminal device 130 may provide an entrance for a quick following or an entrance for a quick private chat etc.

In some implementations, to attract the creator 110 to focus on his/her created multimedia content, the server 120 also may send to the creator 110 the information regarding the browsing details of the multimedia content. For example, the server 120 may send to the creator a notification indicating the number of people either browsing his/her created multimedia content or interacting with him/her over the past day.

Provision of Sunroof Control

To facilitate the user to obtain a plurality of groups of multimedia content published by the creator 110, the terminal device 130 also may configure a sunroof control to quickly obtain update details of the aggregated multimedia content.

Figure 8B:
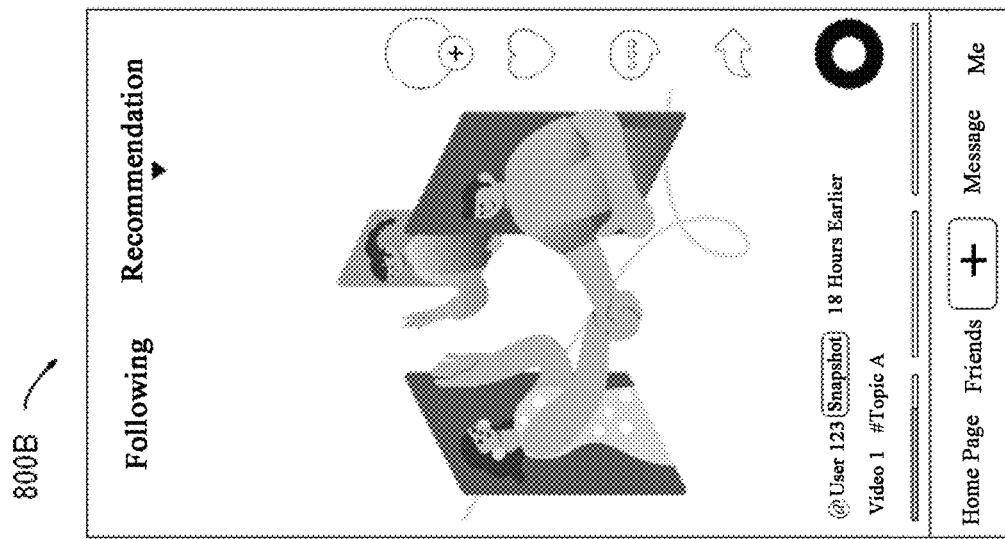
FIGS. 8A-8B illustrate an example interface for viewing a sunroof control in accordance with some embodiments of the present disclosure.
Figure 8A:
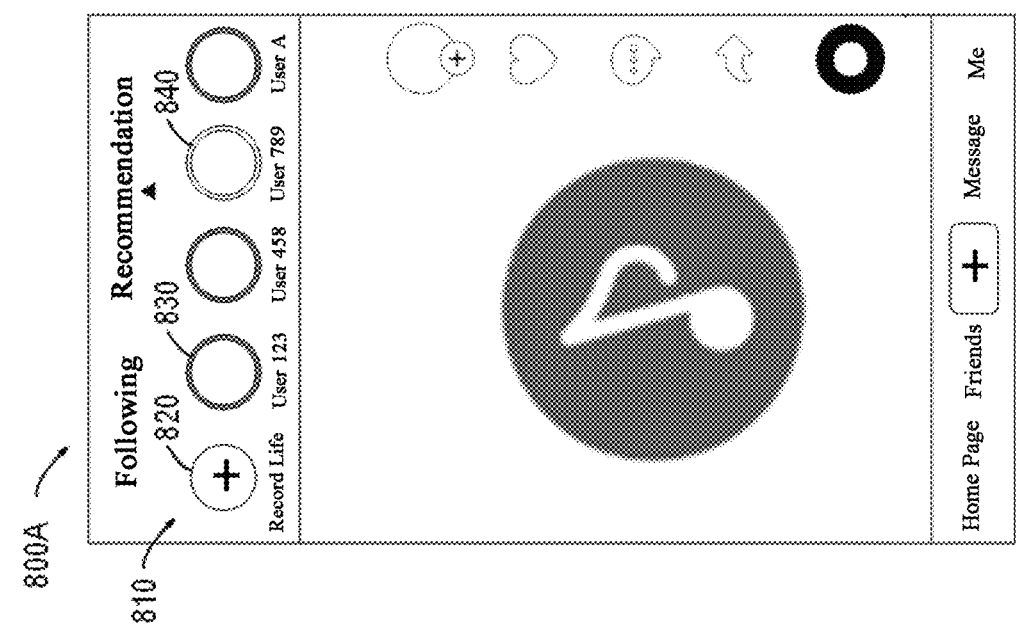

FIG. 8A illustrates an example interface 800A in accordance with embodiments of the present disclosure. As shown, the terminal device 130 may provide, at the top of the interface 800A, a sunroof control 810. In some implementations, the user for example may collapse or expand the sunroof control 810 by clicking a triangle button below the recommendation.

In some implementations, the terminal device 130 for example may present a group of visual elements corresponding to a plurality of accounts in the sunroof control 810, such as visual element 830, visual element 840 and the like in FIG. 8A. In some examples, these visual elements may be avatars corresponding to the plurality of accounts.

In some implementations, the terminal device 130 also may receive a selection for an object visual element from a group of visual elements. Correspondingly, the terminal device 130 may play, in a first page, the first multimedia content of the first group of multimedia content, wherein the first group of multimedia content is associated with an account corresponding to the object visual element. For example, when the user clicks the visual element 830, the terminal device 130 may present an interface 800B, to play the corresponding first group of multimedia content. It is to be appreciated that terminal device 130 for example also may present an interface similar to the interface 300A when the visual element 830 is clicked.

In some implementations, the terminal device 130 also may indicate whether the account has an updated aggregated multimedia content by displaying different colors outside the visual element 830. For example, if the color outside the visual element 830 is red, it means that the user corresponding to the visual element 830 created new multimedia content. On the contrary, if the color outside the visual element 840 is grey, it indicates that the user corresponding to the visual element 840 has not updated multimedia content yet.

In some implementations, the terminal device 130 also may provide a Quick Capture entrance 820 in the sunroof control 810, to guide the user to create multimedia content.

Control of Private Content

Figures 9A, 9B:
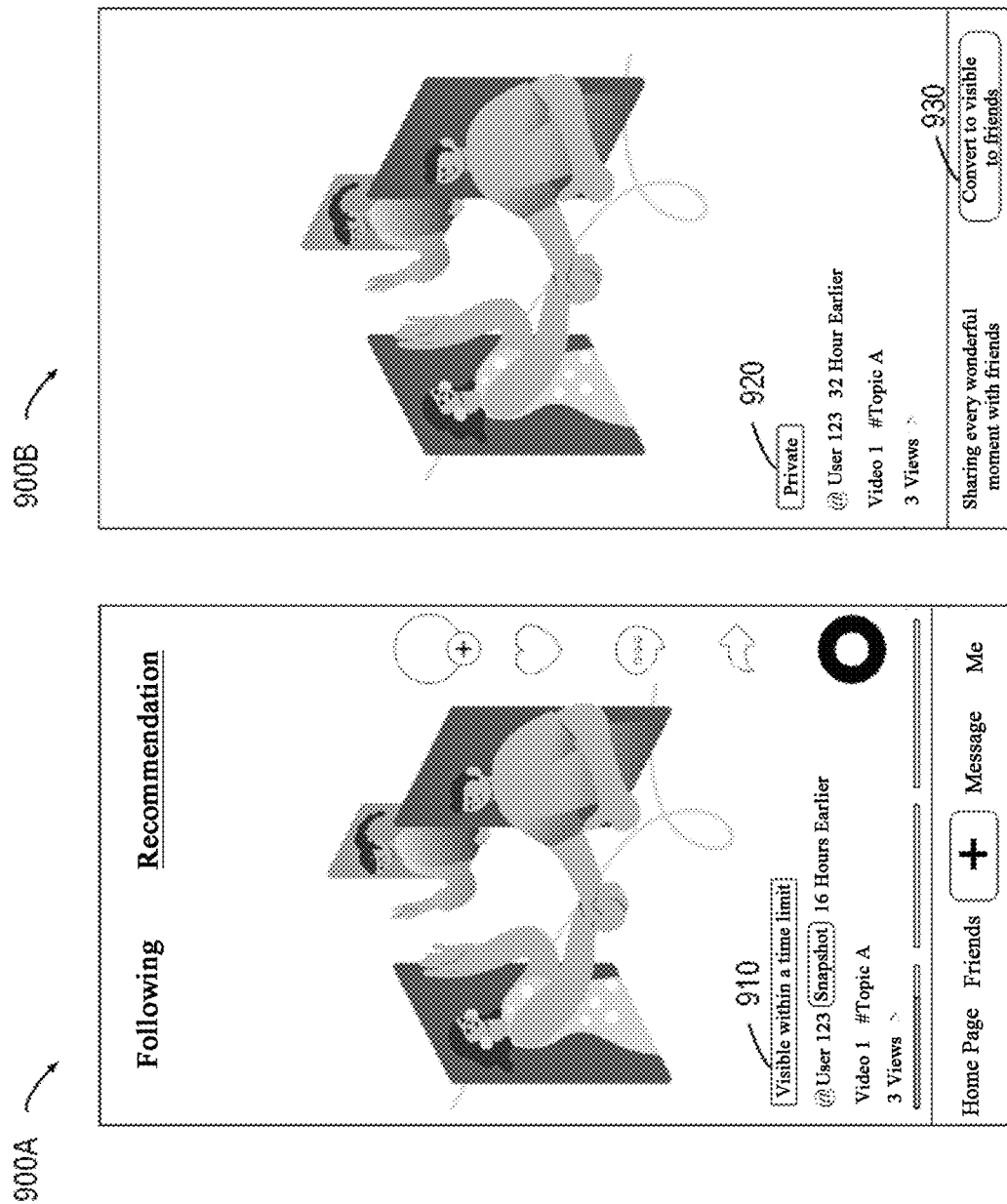
FIGS. 9A-9B illustrate an example interface for guiding content conversion in accordance with some embodiments of the present disclosure.

In some implementations, the aggregated multimedia content of the user, for example, may be visible within a time limit. FIG. 9A illustrates an example interface 900A in accordance with embodiments of the present disclosure. As shown, the terminal device 130 may present a visual indication 910, indicating that the corresponding multimedia content may convert to private content after a predetermined period of time. According to FIG. 9B, after the multimedia content has been converted into the private content, the terminal device 130 may present, in the interface 900B, a visual indication 920 to indicate that this work is a private content.

In some implementations, taking the first multimedia content 210-1 as an example, if the first multimedia content 210-1 has been converted into the private content, the terminal device 130 may remove, from the first group of multimedia content, the first multimedia content 210-1. Afterwards, upon receiving a request for playing the first multimedia content 210-1 again, the terminal device 130 will play the first multimedia content 210-1 independently. Specifically, the terminal device 130 may play the first multimedia content 210-1 included in the third group of multimedia content, wherein the third group of multimedia content only includes the first multimedia content 210-1.

In some implementations, in order to encourage the users to share more content, after the first multimedia content 210-1 is converted into the private content, the terminal device 130 also may present an object control 930 when the first multimedia content 210-1 is being played independently. The object control 930, for example, may be used for generating an instruction for converting the first multimedia content 210-1 into public content. When the user clicks the object space 930, the terminal device 130, for example, may cause the server 120 to convert the first multimedia content into public content and re-aggregate it.

Example Procedure, Apparatus and Device

Figure 10:
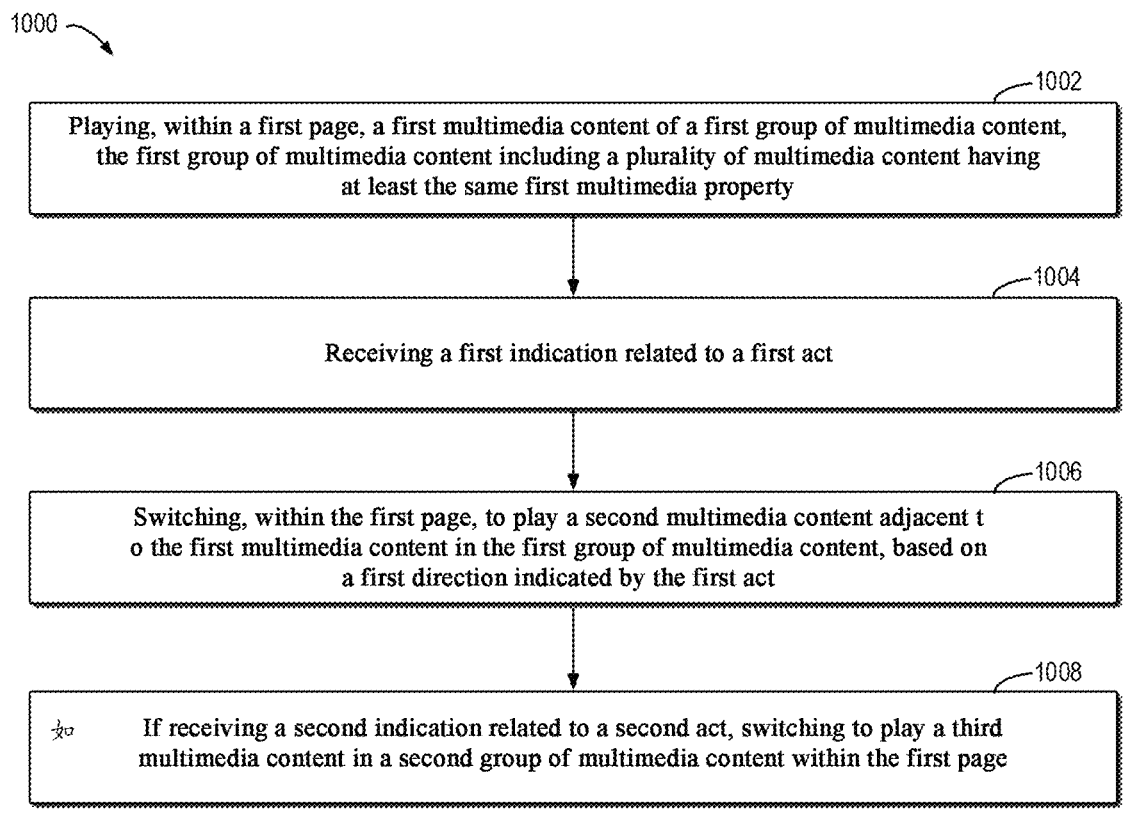
FIG. 10 illustrates a flowchart of an example procedure for providing multimedia content in accordance with some embodiments of the present disclosure.

FIG. 10 illustrates a flowchart of an example procedure 1000 for providing multimedia content in accordance with embodiments of the present disclosure. The procedure 1000, for example, may be implemented by the terminal device 130 in FIG. 1.

At block 1002, the terminal device 130 plays, within a first page, a first multimedia content of a first group of multimedia content, the first group of multimedia content including a plurality of multimedia content having at least the same multimedia property.

At block 1004, the terminal device 130 receives a first indication related to a first act.

At block 1006, the terminal device 130 switches, within the first page, to play a second multimedia content adjacent to the first multimedia content in the first group of multimedia content, based on a first direction indicated by the first act.

At block 1008, if receiving a second indication related to a second act, the terminal device 130 switches, within the first page, to play a third multimedia content in a second group of multimedia content, wherein the second group of multimedia content is different from the first group of multimedia content and includes at least one multimedia content.

According to the procedure for providing multimedia content as described herein, on one hand, the efficiency of pushing the multimedia content is improved by the aggregated playing of a plurality of multimedia content having common multimedia property. On the other hand, the rapid switching between different groups of multimedia content is also achieved, which improves the friendliness of the user interaction and further helps the users more conveniently obtain the multimedia content of interest.

In some implementations, switching, within the first page, to play a third multimedia content in a second group of multimedia content includes: if a second direction indicated by the second act is vertical to the first direction, switching, within the first page, to play the third multimedia content in the second group of multimedia content.

In some implementations, the procedure 1000 further includes: if receiving a third indication related to a third act, switching to a second page different from the first page, wherein a third direction indicated by the third act is identical to the first direction and the first group of multimedia content excludes a second multimedia content adjacent to the second multimedia content and associated with the third direction.

In some implementations, switching, within the first page, to play a third multimedia content in a second group of multimedia content includes: if a second direction indicated by the second act is identical to the first direction and the first group of multimedia content excludes a multimedia content adjacent to the second multimedia content and associated with the second direction, switching, within the first page, to play the third multimedia content in the second group of multimedia content.

In some implementations, the procedure 1000 further includes: if receiving a fourth indication related to a fourth act, switching to a third page different from the first page, wherein a fourth direction indicated by the fourth act is vertical to the first direction.

In some implementations, the procedure 1000 further includes: when presenting the first multimedia content, a first visual indication is presented in the first page to indicate that the first group of multimedia content includes a plurality of multimedia content.

In some implementations, the first multimedia content includes a video or an audio, and the first visual indication is further capable of reflecting play progress of the first multimedia content.

In some implementations, the multimedia property includes at least one of: publisher; publishing time; multimedia type; and subject of content.

In some implementations, the second multimedia content includes a video or an audio, and the procedure 1000 further includes: if play of the second multimedia content is over, automatically switching, within the first page, to play the next multimedia content in the first group of multimedia content.

In some implementations, the first multimedia content includes a video or an audio, the procedure 1000 further includes: during play of the second multimedia content, receiving an operation associated with the second multimedia content; and if the operation is not finished yet, re-playing, within the first page, the second multimedia content or suspending playing the second multimedia content after play of the second multimedia content is over.

In some implementations, the operation includes at least one of: commenting, thumbing-up and sharing.

In some implementations, the first page is a page in an application to which an object account logs on; the second group of multimedia content includes a plurality of multimedia content, and switching, within the first page, to present a third multimedia content in a second group of multimedia content includes: switching, within the first page, to present the third multimedia content in the second group of multimedia content, which is marked as unread by the object account.

In some implementations, the first page is a page in an application to which an object account logs on; the second group of multimedia content includes a plurality of multimedia content, and switching, within the first page, to play a third multimedia content in a second group of multimedia content includes: switching, within the first page, to play the third multimedia content in the second group of multimedia content, which is associated with preferences of the object account.

In some implementations, the first page is a page in an application to which an object account logs on; the second group of multimedia content includes a plurality of multimedia content, and switching, within the first page, to play a third multimedia content in a second group of multimedia content includes:

switching, within the first page, to play the third multimedia content in the second group of multimedia content last browsed by the object account las time.

In some implementations, the third multimedia content is a video or an audio, and switching, within the first page, to play the third multimedia content in the second group of multimedia content last browsed by the object account last time includes: starting to play the third multimedia content from an object starting point of the third multimedia content, wherein the object starting point is determined based on the last browsing of the third multimedia content by the object account last time.

In some implementations, the procedure 1000 further includes: pre-loading at least one multimedia content in the first group of multimedia content during play of the first multimedia content, wherein the number of the pre-loaded at least one multimedia content is less than a predetermined number threshold.

In some implementations, playing, within a first page, a first multimedia content of a first group of multimedia content includes: receiving a selection of a first cover associated with the first group of multimedia content in a personal homepage associated with a specific account; and playing, within the first page, the first multimedia content of the first group of multimedia content, wherein the personal homepage includes at least the first cover and a second cover associated with the second group of multimedia content.

In some implementations, the procedure 1000 further includes: presenting in the first page a second visual indication, to indicate that the first multimedia content will be converted into private content after a predetermined period of time.

In some implementations, the procedure 1000 further includes: if the first multimedia content has been converted into the private content, removing the first multimedia content from the first group of multimedia content; receiving a request for playing the first multimedia content; and playing the first multimedia content included in a third group of multimedia content, the third group of multimedia content including the first multimedia content only.

In some implementations, the procedure 1000 further includes: when playing the first multimedia content included in the third group of multimedia content, presenting an object control used for generating an instruction for converting the first multimedia content into public content.

In some implementations, the procedure 1000 further includes: receiving a request for viewing a browsing history of the first multimedia content; and presenting a history of browsing the first multimedia content.

In some implementations, playing, within a first page, a first multimedia content of a first group of multimedia content includes: presenting, in a sunroof control, a group of visual elements corresponding to a plurality of accounts, wherein the sunroof control is capable of being collapsed or expanded in response to a select operation; and receiving a selection of an object visual element in the group of visual elements; and playing, within the first page, the first multimedia content of the first group of multimedia content, wherein the first group of multimedia content is associated with an account corresponding to the object visual element.

Figure 11:
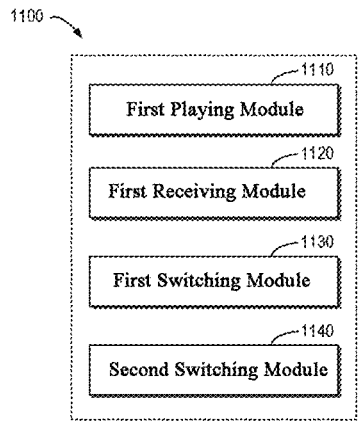
FIG. 11 illustrates a schematic structure diagram of an apparatus for providing multimedia content in accordance with some embodiments of the present disclosure.

Embodiments of the present disclosure also provide a corresponding apparatus for implementing the above method or procedure. FIG. 11 illustrates a schematic structure diagram of an apparatus 1100 for providing multimedia content in accordance with some embodiments of the present disclosure.

As shown in FIG. 11, the apparatus 1100 includes: a first play module 1110 configured to play, within a first page, a first multimedia content of a first group of multimedia content, the first group of multimedia content including a plurality of multimedia content having at least the same multimedia property. The apparatus 1100 further includes a first receiving module 1120 configured to receive a first indication related to a first act. Besides, the apparatus 1100 also includes a first switching module 1130 configured to switch, within the first page, to play a second multimedia content adjacent to the first multimedia content in the first group of multimedia content, based on a first direction indicated by the first act. Moreover, the apparatus 1100 further includes a second switching module 1140 configured to, if receiving a second indication related to a second act, switch, within the first page, to play a third multimedia content in a second group of multimedia content, wherein the second group of multimedia content is different from the first group of multimedia content and includes at least one multimedia content.

In some implementations, the second switching module 1140 includes: a first inter-group switching module configured to, if a second direction indicated by the second act is vertical to the first direction, switch, within the first page, to play the third multimedia content in the second group of multimedia content.

In some implementations, the apparatus 1100 also includes: a first page switching module configured to, if receiving a third indication related to a third act, switch to a second page different from the first page, wherein a third direction indicated by the third act is identical to the first direction and the first group of multimedia content excludes a second multimedia content adjacent to the second multimedia content and associated with the third direction.

In some implementations, the second switching module 1140 includes: a second inter-group switching module configured to, if a second direction indicated by the second act is identical to the first direction and the first group of multimedia content excludes a multimedia content adjacent to the second multimedia content and associated with the second direction, switch, within the first page, to play the third multimedia content in the second group of multimedia content.

In some implementations, the apparatus 1100 also includes: a second page switching module configured to, if receiving a fourth indication related to a fourth act, switch to a third page different from the first page, wherein a fourth direction indicated by the fourth act is vertical to the first direction.

In some implementations, the apparatus 1100 also includes a first presenting module configured to, when presenting the first multimedia content, present a first visual indication in the first page to indicate that the first group of multimedia content includes a plurality of multimedia content.

In some implementations, the first multimedia content includes a video or an audio, and the first visual indication is further capable of reflecting play progress of the first multimedia content.

In some implementations, the multimedia property includes at least one of: publisher; publishing time period; multimedia type; and subject of content.

In some implementations, the second multimedia content includes a video or an audio, and the apparatus 1100 also includes: an automatic switching module configured to, if play of the second multimedia content is over, automatically switch, within the first page, to play the next multimedia content in the first group of multimedia content.

In some implementations, the first multimedia content includes a video or an audio, the apparatus 1100 also includes: an operation receiving module configured to receive an operation associated with the second multimedia content during play of the second multimedia content; and a suspension switching module configured to, if the operation is not finished yet, after play of the second multimedia content is over, re-play, within the first page, the second multimedia content or suspend playing the second multimedia content.

In some implementations, the operation includes at least one of: commenting, thumbing-up and sharing.

In some implementations, the first page is a page in an application to which an object account logs on; the second group of multimedia content includes a plurality of multimedia content, and the second switching module 1140 includes an unread content playing module configured to switch, within the first page, to present a third multimedia content in a second group of multimedia content, wherein the third multimedia content is marked as unread by the object account.

In some implementations, the first page is a page in an application to which an object account logs on; the second group of multimedia content includes a plurality of multimedia content, and the second switching module 1140 includes a preference content playing module configured to switch, within the first page, to play the third multimedia content in the second group of multimedia content associated with preferences of the object account.

In some implementations, the first page is a page in an application to which an object account logs on; the second group of multimedia content includes a plurality of multimedia content, and the second switching module 1140 includes a history play module configured to switch, within the first page, to play the third multimedia content in the second group of multimedia content last browsed by the object account.

In some implementations, the third multimedia content is a video or an audio, and the history play module includes: a breakpoint play module configured to start to play the third multimedia content from an object starting point of the third multimedia content, wherein the object starting point is determined based on the last browsing of the third multimedia content by the object account.

In some implementations, the apparatus 1100 also includes: a pre-loading module configured to pre-load at least one multimedia content in the first group of multimedia content during play of the first multimedia content, wherein the number of the pre-loaded at least one multimedia content is less than a predetermined number threshold.

In some implementations, the first play module 1100 includes: a second receiving module configured to receive a selection of a first cover associated with the first group of multimedia content in a personal homepage associated with a specific account; and a second play module configured to play, within the first page, the first multimedia content of the first group of multimedia content, wherein the personal homepage includes at least the first cover and a second cover associated with the second group of multimedia content.

In some implementations, the apparatus 1100 also includes: a second presenting module configured to present, in the first page, a second visual indication, to indicate that the first multimedia content will be converted into private content after a predetermined period of time.

In some implementations, the apparatus 1100 also includes: a removal module configured to, if the first multimedia content has been converted into the private content, remove the first multimedia content from the first group of multimedia content; a third receiving module configured to receive a request for playing the first multimedia content; and a third play module configured to play the first multimedia content included in a third group of multimedia content, the third group of multimedia content including the first multimedia content only.

In some implementations, the apparatus 1100 also includes: a third presenting module configured to, when playing the first multimedia content included in the third group of multimedia content, present an object control, the object control used for generating an instruction for converting the first multimedia content into public content.

In some implementations, the apparatus 1100 also includes: a fourth receiving module configured to receive a request for viewing a browsing history of the first multimedia content; and a fourth presenting module configured to present a history of browsing the first multimedia content.

In some implementations, the first play module 1100 includes: a fifth presenting module configured to present, in a sunroof control, a group of visual elements corresponding to a plurality of accounts, wherein the sunroof control is capable of being collapsed or expanded in response to a select operation; and a fifth receiving module configured to receive a selection of an object visual element in the group of visual elements; and a fourth play module configured to play, within the first page, the first multimedia content of the first group of multimedia content, wherein the first group of multimedia content is associated with an account corresponding to the object visual element.

Figure 12:
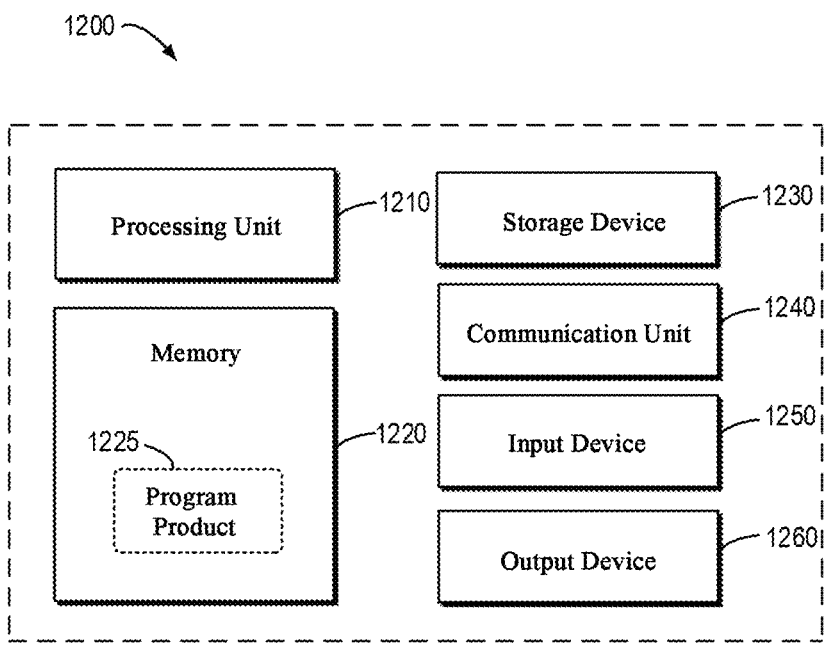
FIG. 12 illustrates a block diagram of a computing device that can carry out a plurality of embodiments of the present disclosure.

FIG. 12 illustrates a block diagram of a computing device/server 1200 that can carry out a plurality of embodiments of the present disclosure. It should be understood that the computing device/server 1200 shown in FIG. 12 is only exemplary and shall not constitute any restrictions over functions and scopes of the implementations described by the present disclosure.

According to FIG. 12, the computing device/server 1200 is in the form of a general purpose computing device. Components of the computing device/server 1200 can include, but not limited to, one or more processors or processing units 1210, memory 1220, storage device 1230, one or more communication units 1240, one or more input devices 1250 and one or more output devices 1260. The processing unit 1210 can be a physical or virtual processor and can execute various processing based on the programs stored in the memory 1220. In a multi-processor system, multiple processing units execute computer-executable instructions in parallel to enhance parallel processing capability of the computing device/server 1200.

The computing device/server 1200 usually includes a plurality of computer storage media. Such media can be any attainable media accessible by the computing device/server 1200, including but not limited to volatile and non-volatile media, removable and non-removable media. The memory 1220 can be a volatile memory (e.g., register, cache, Random Access Memory (RAM)), a non-volatile memory (such as, Read-Only Memory (ROM), Electrically Erasable Programmable Read-Only Memory (EEPROM), flash), or any combinations thereof. The storage device 1230 can be removable or non-removable medium, and can include machine readable medium, such as flash drive, magnetic disk or any other media, which can be used for storing information and/or data (e.g., data for training) and can be accessed within the computing device/server 1200.

The computing device/server 1200 can further include a further removable/non-removable, volatile/non-volatile storage medium. Although not shown in FIG. 12, there can be provided a disk drive for reading from or writing into a removable and non-volatile disk (such as floppy disk) and an optical disk drive for reading from or writing into a removable and non-volatile optical disk. In such cases, each drive can be connected via one or more data medium interfaces to the bus (not shown). The memory 1220 may include a computer program product 1225 having one or more program modules, and these program modules are configured to execute various methods or acts according to different embodiments of the present disclosure.

The communication unit 1240 implements communication with another computing device through communication media. Additionally, functions of components of the computing device/server 1200 can be realized by a single computing group or a plurality of computing machines and these computing machines can communicate through communication connections. Therefore, the computing device/server 1200 can be operated in a networked environment using a logic connection to one or more other servers, a Personal Computer (PC) or a further general network node.

The input device 1250 can be one or more input devices, such as mouse, keyboard, trackball, trackball and the like. The output device 1260 can be one or more output devices, e.g., display, loudspeaker and printer etc. The computing device/server 1200 also can communicate through the communication unit 1240 with one or more external devices (not shown) as required, wherein the external device, e.g., storage device, display device etc., communicates with one or more devices that enable the users to interact with the computing device/server 1200, or with any devices (such as network card, modem and the like) that enable the computing device/server 1200 to communicate with one or more other computing devices. Such communication can be executed via Input/Output (I/O) interface (not shown).

In accordance with example implementations of the present disclosure, there is provided a computer-readable storage medium having stored thereon one or more computer instructions, wherein the one or more computer instructions are executed by the processor to implement the above described method.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions includes an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable those ordinary skilled in the art to understand implementations of the present disclosure.

We claim:

1. A method for switching multimedia content based on a respective act, including:
    playing, within a first page, a first multimedia content of a first group of multimedia content, the first group of multimedia content including a first plurality of multimedia content having at least the same multimedia property;
    receiving a first indication related to a first act;
    switching, within the first page, to play a second multimedia content adjacent to the first multimedia content in the first group of multimedia content, based on a first direction indicated by the first act;
    receiving a second indication related to a second act;
    switching, within the first page, to play a third multimedia content associated with an object account in a second group of multimedia content, wherein the first page is a recommendation page for the object account, wherein the second group of multimedia content is different from the first group of multimedia content and includes a second plurality of multimedia content having at least the same multimedia property, different from the multimedia property of the first group of multimedia content, and wherein the second plurality of multimedia content further includes at least one multimedia content including the third multimedia content;
    receiving a third indication related to a third act; and
    switching to a second page different from the first page, wherein the second page is a homepage of a user associated with the second multimedia content, the homepage includes at least one cover of multimedia content published by the user, and wherein a third direction indicated by the third act is identical to the first direction, and the first group of multimedia content excludes a fourth multimedia content adjacent to the second multimedia content and associated with the third direction.

2. The method of claim 1, wherein switching, within the first page, to play a third multimedia content associated with an object account in a second group of multimedia content includes:
    determining that a second direction indicated by the second act is vertical to the first direction; and
    switching, based on the determination and within the first page, to play the third multimedia content associated with the object account in the second group of multimedia content.

3. The method of claim 1, wherein switching, within the first page, to play a third multimedia content associated with an object account in a second group of multimedia content includes:
- determining that a second direction indicated by the second act is identical to the first direction and the first group of multimedia content excludes a fifth multimedia content adjacent to the second multimedia content and associated with the second direction; and
- switching, based on the determination and within the first page, to play the third multimedia content associated with the object account in the second group of multimedia content.

4. The method of claim 3, further including:
- receiving a fourth indication related to a fourth act; and
- switching to a third page different from the first page, wherein a fourth direction indicated by the fourth act is vertical to the first direction.

5. The method of claim 1, further including:
- playing the first multimedia content; and
- presenting, in the first page, a first visual indication to indicate that the first group of multimedia content includes the first plurality of multimedia content.

6. The method of claim 5, wherein the first multimedia content includes a video or an audio, and the first visual indication is further capable of reflecting play progress of the first multimedia content.

7. The method of claim 1, wherein the multimedia property includes at least one of:
- publisher;
- publishing time period;
- multimedia type; or
- subject of content.

8. The method of claim 1, wherein the second multimedia content includes a video or an audio, and the method further includes:
- determining that playing of the second multimedia content is over; and
- automatically switching, based on the determination and within the first page, to play the next multimedia content in the first group of multimedia content.

9. The method of claim 1, wherein the first multimedia content includes a video or an audio, the method further includes:
- receiving, during the playing of the second multimedia content, an operation associated with the second multimedia content;
- determining that the operation has not been finished yet; and
- re-playing or suspending playing, based on the determination and within the first page, the second multimedia content after the playing of the second multimedia content is over.

10. The method of claim 1, wherein the first page is a page in an application to which the object account logs on; the second group of multimedia content includes the second plurality of multimedia content, and switching, within the first page, to present a third multimedia content in a second group of multimedia content includes:
- switching, within the first page, to present the third multimedia content in the second group of multimedia content, wherein the third multimedia content is marked as unread by the object account.

11. The method of claim 1, wherein the first page is a page in an application to which an object account logs on; the second group of multimedia content includes the second plurality of multimedia content, and switching, within the first page, to play a third multimedia content in a second group of multimedia content includes:
- switching, within the first page, to play the third multimedia content in the second group of multimedia content associated with preferences of the object account.

12. The method of claim 1, wherein the first page is a page in an application to which an object account logs on; the second group of multimedia content includes the second plurality of multimedia content, and switching, within the first page, to play a third multimedia content in a second group of multimedia content includes:
- switching, within the first page, to play the third multimedia content in the second group of multimedia content last browsed by the object account last time.

13. The method of claim 12, wherein the third multimedia content is a video or an audio, and switching, within the first page, to play the third multimedia content in the second group of multimedia content last browsed by the object account last time includes:
- starting to play the third multimedia content from an object starting point of the third multimedia content, wherein the object starting point is determined based on the last browsing of the third multimedia content by the object account.

14. The method of claim 1, further including:
- pre-loading at least one multimedia content in the first group of multimedia content during the playing of the first multimedia content, wherein the number of the pre-loaded at least one multimedia content is less than a predetermined number threshold.

15. The method of claim 1, wherein playing, within a first page, a first multimedia content of a first group of multimedia content includes:
- receiving a selection of a first cover associated with the first group of multimedia content in a personal homepage associated with a specific account; and
- playing, within the first page, the first multimedia content of the first group of multimedia content, wherein the personal homepage includes at least the first cover and a second cover associated with the second group of multimedia content.

16. The method of claim 1, further including:
- presenting, in the first page, a second visual indication, to indicate that the first multimedia content will be converted into private content after a predetermined period of time.

17. The method of claim 16, also further including:
- determining that the first multimedia content has been converted into the private content;
- removing, based on the determination and from the first group of multimedia content, the first multimedia content;
- receiving a request for playing the first multimedia content; and
- playing the first multimedia content included in a third group of multimedia content, the third group of multimedia content including the first multimedia content only.

18. The method of claim 17, further including:
- playing the first multimedia content included in the third group of multimedia content; and
- presenting an object control used for generating an instruction for converting the first multimedia content into public content.

19. The method of claim 1, further including:
receiving a request for viewing a browsing history of the first multimedia content; and
presenting a history of browsing the first multimedia content.

20. The method of claim 1, wherein playing, within a first page, a first multimedia content of a first group of multimedia content includes:
presenting, in a sunroof control, a group of visual elements corresponding to a plurality of accounts, wherein the sunroof control is capable of being collapsed or expanded based on a select operation; and
receiving a selection of an object visual element in the group of visual elements; and
playing, within the first page, the first multimedia content of the first group of multimedia content, wherein the first group of multimedia content is associated with an account corresponding to the object visual element.

21. An electronic device, including:
a memory and a processor;
wherein the memory stores one or more computer instructions, wherein the one or more computer instructions are executed by the processor to implement the method according to claim 1.

22. A non-transitory computer-readable storage medium having stored thereon one or more computer instructions, wherein the one or more computer instructions are executed by a processor to implement the method according to claim 1.

* * * * *